Feb. 15, 1944. W. H. DE LANCEY 2,341,532
LIQUID DISPENSING APPARATUS
Filed March 5, 1943 3 Sheets-Sheet 1
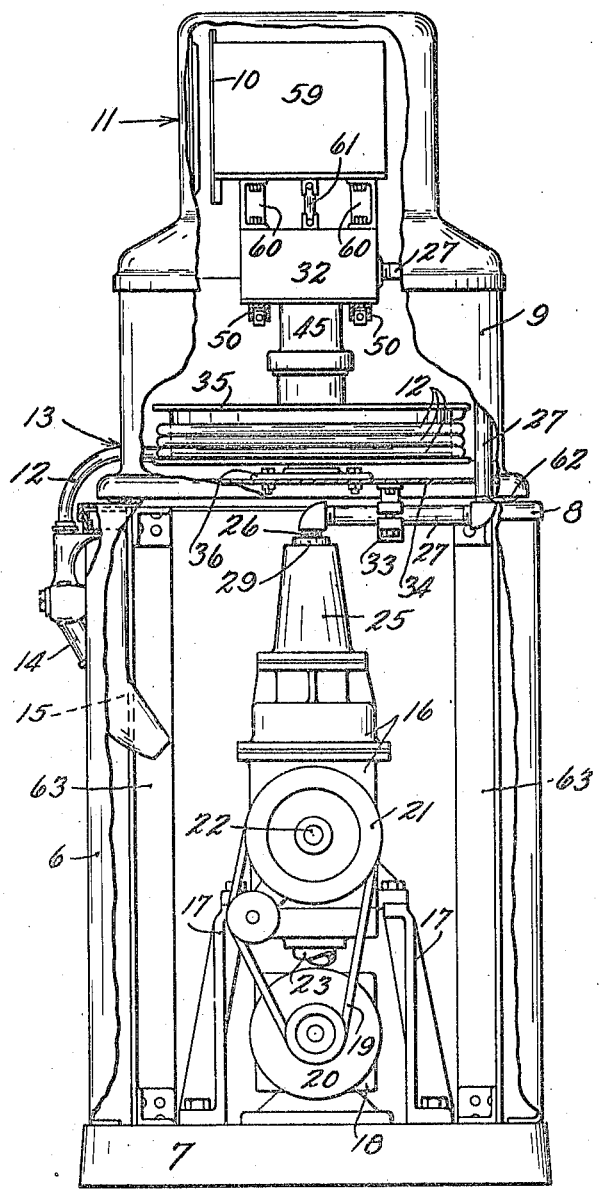
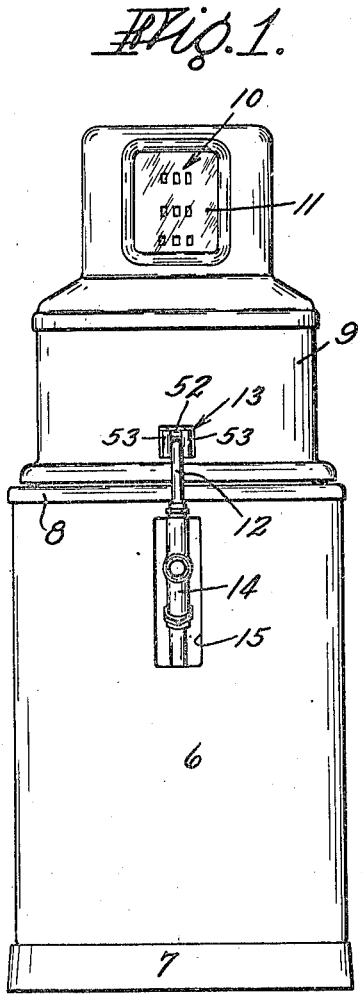
INVENTOR
WARREN H. DE LANCEY
BY Chapin & Neal
ATTORNEYS

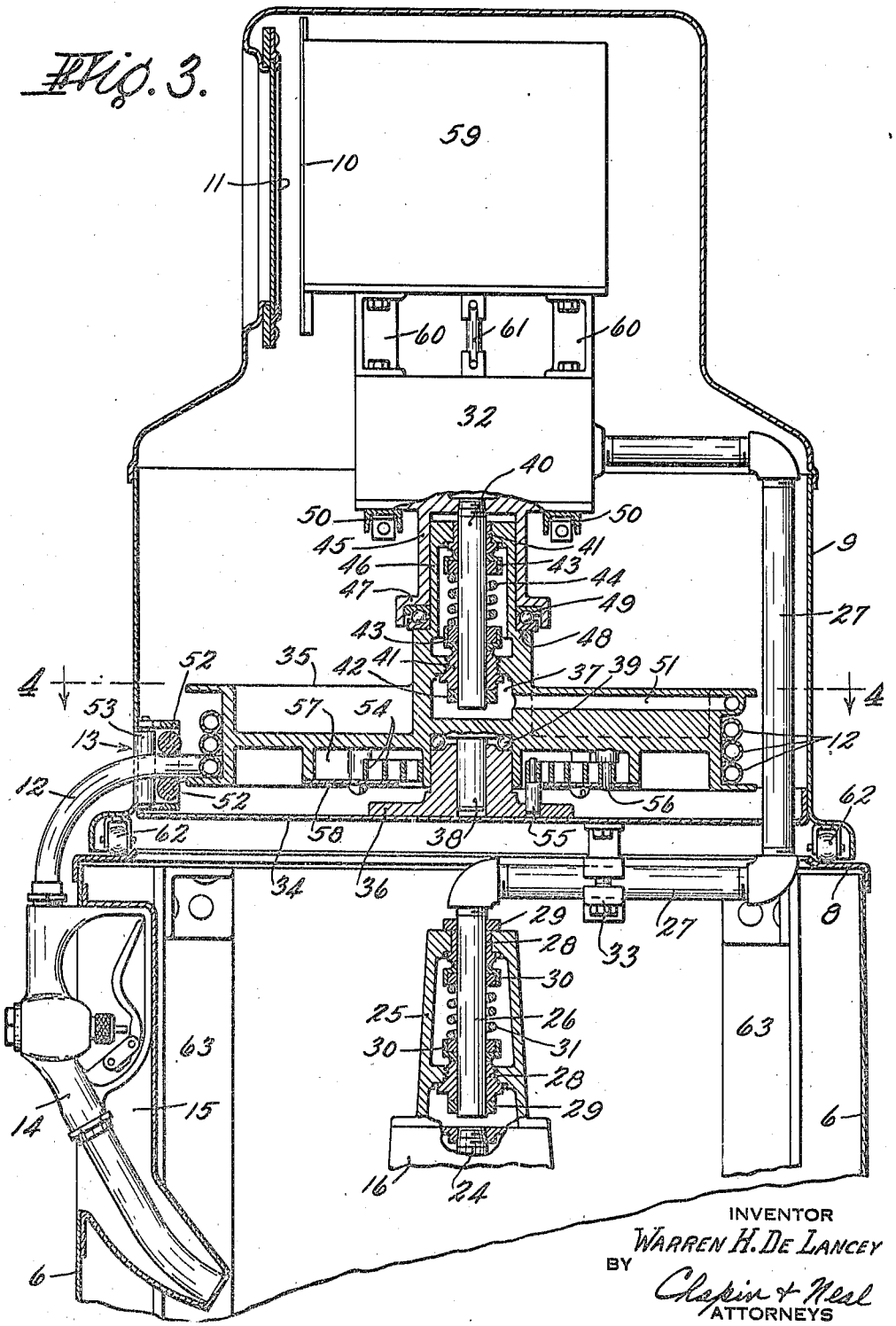

Patented Feb. 15, 1944

2,341,532

UNITED STATES PATENT OFFICE 2,341,532

LIQUID DISPENSING APPARATUS

Warren H. De Lancey, Springfield, Mass., assignor to Gilbert & Barker Manufacturing Company, West Springfield, Mass., a corporation of Massachusetts Application March 5, 1943, Serial No. 478,061

6 Claims. (Cl. 221—95)

This invention relates to an improved liquid dispensing apparatus of the type used for dispensing measured quantities of gasoline or the like.

The invention has for its chief object the provision in apparatus of the class described of a rotatable turret which carries a register for indicating the quantity and/or cost of the liquid dispensed and which houses within it a hose reel.

More particularly, the arrangement is such that the turret can be turned by pulling on the hose for the purpose of moving the register into such position that its indications can be conveniently read by the operator from the position which he occupies when servicing an automobile. The arrangement is also such that substantially all the hose is wound up on the reel during idle periods of the apparatus. There is no loop of hose exposed on the outside of the casing which will permit a car to be serviced without pulling on the hose and therefore without turning the turret. The operator is compelled to pull out some hose in order to service a car, and when he does so, he also causes turning of the turret to a position such that the register faces in the direction of the pull so that its indications will be readily visible to the operator.

The invention will be disclosed with reference to the accompanying drawings, in which:

Fig. 1 is an exterior elevational view, drawn to a small scale, of a gasoline dispensing and measuring apparatus embodying the invention;

Fig. 2 is an elevational view thereof, taken at right angles to Fig. 1 and drawn to a larger scale, certain parts of the casing being broken away to reveal interior mechanism;

Fig. 3 is a fragmentary sectional view, drawn to a still larger scale and showing in detail the mounting of the turret and hose reel.

Figure 4:
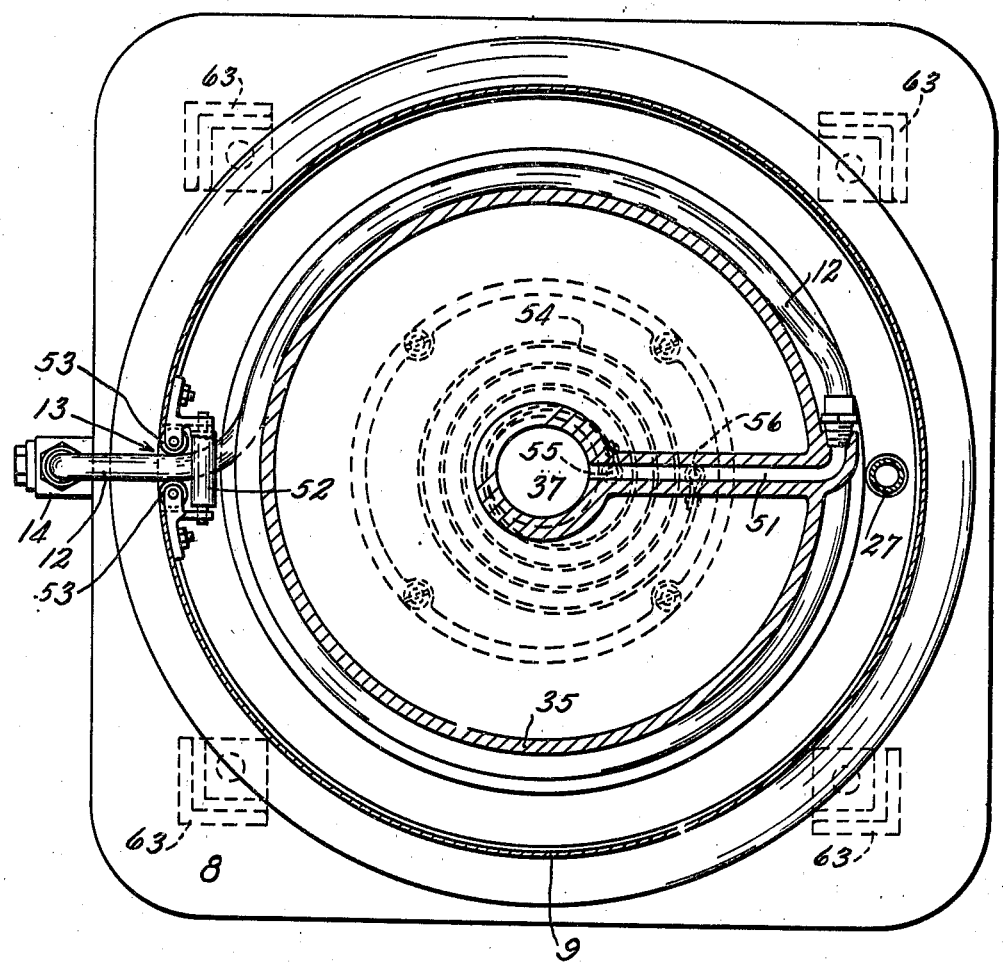
Fig. 4 is a sectional plan view taken on the line 4—4 of Fig. 3.

Referring to these drawings; the dispensing apparatus (Fig. 1) includes a stationary housing 6, forming a standard upstanding from a base 7 and surmounted by a cap 8. Above the cap is a rotatable turret 9, rotatable about a vertical axis and carrying a register, the dial face 10 of which is visible through a window 11 in the turret. Within the turret (Fig. 2) is a hose reel, also rotatable about a vertical axis. The hose 12 from the reel emerges from the turret through an exit opening 13, located vertically below the center of the dial face 10 of the register. Only a very small amount of the hose is exposed outside the turret—just enough to allow the nozzle 14 of the hose to be placed in the recess 15 provided for it in the stationary housing 6. Thus, in order to service a car, the operator must remove the nozzle 14 from recess 15 and pull on the nozzle to draw out sufficient hose to reach the car. In the act of drawing out the hose the turret will automatically be turned until the face of dial 10 lies at right angles to the line of pull. In this way, it is insured that the register will always be positioned so that the operator can easily read its indications while servicing a car. After the servicing is completed, the hose reel will wind up the hose, when the operator relaxes his pull and, in order to hang up the hose nozzle in the only space provided for it, viz., the recess 15, the turret must be turned back to its original position. Such position would normally be one in which the dial face of the register substantially parallels the curb.

Referring now to the details of the exemplary apparatus, it includes, as shown in Fig. 2, a casing 16 which houses the pump, air separator and related devices. This casing is supported above base 7 by a pair of standards 17. Between these standards and mounted on base 7 is an electric motor 18 which by a belt 19 and pulleys 20 and 21 drives the shaft 22 of the pump. The suction pipe of the pump is shown at 23 and it is adapted for connection to the usual low-level supply tank. The pumped liquid leaves the casing 16 by way of a pipe 24 (Fig. 3) and enters the interior of a casing 25 secured on top of casing 16. In this casing 25, the lower end 26 of the discharge 27 is mounted to turn about a vertical axis. The end 26 is rotatably mounted in upper and lower bearings 28 in the casing 25 and held against axial movement by collars 29 suitably fixed on the end 26, one above the upper bearing 28 and engaging the upper face thereof and one below the lower bearing and engaging the lower face thereof. Seal rings 30 on the pipe end 26 are urged apart by a coil spring 31 and pressed into engagement one with the upper face of the lower bearing and the other with the lower face of the upper bearing. The discharge pipe 27 extends radially outward from its swiveled end 26, thence upwardly close to the outer wall of turret 9 and thence radially inward for connection to the meter 32. The pipe 27 is suitably connected to the turret to turn therewith, as indicated for example by the bracket 33 in which the pipe is clamped and which is secured to a sheet metal head 34. This head is suitably secured along its marginal edge to the turret and forms a base to carry the load of the hose reel, meter and register.

The hose reel 35 is rotatably mounted on a support 36 suitably secured to base 34. The lower part of the hub of the reel is bored out to rotatably receive the finished external periphery of the hub of support 36. The upper part of the hub of the reel is hollow affording a chamber 37. Depending from the bottom wall of chamber 37 is a stud 38 which is rotatably mounted in the central bore of the support 36. An anti-friction thrust bearing 39 is provided between the upper face of bracket 36 and the lower wall of chamber 37. The reel is thus supported and mounted for rotation about a vertical axis. Such axis is alined with the axis of the swivelled pipe end 26.

The meter 32 is rotatably supported from the hose reel. The outlet pipe 40 of the meter is rotatably mounted in upper and lower bearings 41 in the upper portion of the hub of the hose reel. The lower end of this pipe 40 extends into and communicates with the chamber 37, above described. A collar 42 on pipe 40 cooperates with the lower bearing 41 to hold the pipe against axially upward movement. Seal rings 43, mounted on pipe 40 and pressed apart by a coil spring 44, engage the adjacent end faces of the two bearings 41 to prevent leakage from chamber 37 around pipe 40. The meter has a depending sleeve 45 which telescopes and is rotatably mounted on the external periphery of the upper portion 46 of the reel hub. The lower end of sleeve 46 has a flange 47 and between this flange and a shoulder 48 on the reel hub is an anti-friction thrust bearing 49. The meter is fixed to the turret through the intermediary of two channels 50, which span the turret and are secured at their ends thereto, as indicated. By these provisions, the meter can turn relatively to the hose reel 35 about a vertical axis which is alined with the vertical axis of the reel.

The gasoline leaving the meter 32 by way of pipe 40 enters chamber 37 in the hub of the hose reel and thence passes radially outward through a cored passage 51 in the body of the reel. The outer end of passage 51 (Fig. 4) is turned at right angles and receives one end of hose 12. The hose is wound on reel 35 to the extent of several convolutions and the outer end of the hose emerges from the turret through hole 13 for connection to nozzle 14. The hose also passes between two horizontal rolls 53—these rolls lying close together and close to the outer wall of the turret just behind opening 13. The rolls of each pair are spaced apart just sufficiently to receive between them the hose.

The hose reel 35 is turned in the direction to wind up hose 12 (clockwise as viewed in Fig. 4) by a spiral spring 54 suitably secured at one end to the support 36, as to a pin 55 fixed to the flange of said support, and at the other end to the hose reel as to a pin 56. The spring is housed in a chamber 57 formed in the hose reel and partially closed by a plate 58 fixed to the reel.

The register, shown at 59 is supported by brackets 60 from meter 32 and is driven from the meter by shaft 61.

The turret may be provided with a series of rolls 62 (Fig. 3) which ride on the upper face of cap 8 as a track. This cap is supported from base 7 by a series of angle iron columns 63.

The apparatus may be provided with any of the usual controls or accessories which are deemed necessary or desirable. No such controls or accessories have been illustrated or described herein because they are not necessary to an understanding of the invention which relates to a hose reel, mounted in a register-carrying turret rotatable by pulling on the hose as the latter is unwound from the reel.

In operation, the spring 54 turns the reel and causes all the hose possible to be wound up thereon. As shown, the interengagement of the nozzle 14 with one of the walls of recess 15, which wall forms a nozzle supporting means, limits the extent to which the hose can be wound up. Only a very small portion of the hose is exposed outside the casing. Even when the apparatus is not in use and the nozzle 14 is hung up as shown, the spring 54 maintains a pull on the hose whereby the very short part, which extends from the reel to the nozzle, is kept under tension. The exposed part of the hose cannot therefore be arranged in the form of a loop but is forced to lie in the shortest path possible for it to take between the nozzle and the reel. Since the hose is under tension, when the nozzle is hung up on the standard, the turret will be held in a predetermined rest position with relation to the turret,—such position being that illustrated.

When the operator desires to service the tank of an automobile, he removes the nozzle 14 from its supporting means and, having previously started motor 20, he walks to the automobile, holding the nozzle in his hand. The spring 54 yields and the reel is turned by the pull on the hose to unwind so much of the hose from the reel as is necessary to reach the tank. At the same time, the turret is also turned by the pull on the hose. It swings to the right or left and through whatever angle is necessary, actually following the hose and maintaining the register window 11 always at right angles to the direction of pull. With the spring 54 pulling on one end of the hose and the operator holding the other end, the hose has to assume a straight line or more strictly to lie all in one vertical plane which extends from turret to the register. The hose will naturally sag between the ends which support it but, when viewed from above, it will lie in a straight line. The register is therefore always kept in the direct line of sight of the operator who simply has to look in the direction of his pull on the hose. When servicing is completed, the operator walks back to the standard 6 and the spring 54 winds up the hose as fast as the operator allows it to do so. This will continue until the nozzle abuts the turret, unless the operator places the nozzle in the recess as is intended, and, when he does this, the turret is automatically brought back to its predetermined rest position.

What I claim is:

1. In liquid measuring and dispensing apparatus, a standard, a turret rotatably mounted on said standard, a hose reel housed within and supported by the turret and rotatable independently thereof, a dispensing hose connected at one end to said reel and extending outwardly through the turret and having a nozzle on its outer end, yieldable means for turning the reel and winding up the hose thereon to the extent permitted by said nozzle, a liquid supply conduit connected to the reel to supply said hose, a meter interposed in said conduit, a register driven by the meter and carried by and rotatable with the turret, and means for forcing liquid through said conduit, meter and hose, said turret adapted to follow the hose when the hose is pulled to unwind it from the reel and when the hose is released to allow it to be wound up on the reel.

2. In liquid measuring and dispensing apparatus, a standard, a turret rotatably mounted on said standard, a hose reel housed within and supported by the turret and rotatable independently thereof, a dispensing hose connected at one end to said reel and extending outwardly through the turret and having a nozzle on its outer end, means for supporting said nozzle from said standard during idle periods of the apparatus, yieldable means for turning the reel and winding up the hose thereon to the extent permitted by the engagement of said nozzle and supporting means, a liquid supply conduit connected to the reel to supply said hose, a meter interposed in said conduit, a register driven by the meter and carried by and rotatable with the turret, and means for forcing liquid through said conduit, meter and hose, said turret adapted to follow the hose when the hose is pulled to unwind it from the reel and when the hose is released to allow it to be wound up on the reel.

3. In combination, a standard, a hollow turret mounted on the standard for rotation about a vertical axis, a hose reel mounted on the turret for rotation independently of the turret about a vertical axis, a dispensing conduit in part mounted on said standard and in part mounted on the turret and including a connection enabling rotation of the turret, said conduit also including a hose which is connected at one end to the reel and the other end of which extends out of the turret through an exit opening and is provided with a nozzle on the delivery end thereof, means for turning the turret and tending to maintain all of the hose except the nozzle bearing end wound up on the reel, a meter interposed in said conduit, a register carried by and rotatable with the turret, the indications of the register being visible from outside the turret when looking in the direction of the axis of said exit opening, means on the standard for forcing liquid through said conduit, said hose being unwound by the pull on the hose as the operator walks from the standard to the car to be serviced and said turret being turned by the pull on the hose so that the indications of the register may always be seen by the operator while standing at the car and looking in the direction in which the hose is pulled.

4. The combination in liquid measuring and dispensing apparatus, of a standard, a turret comprising a hollow casing supported by the standard for rotation about a vertical axis, a hose reel housed within and supported by the casing for rotation independently of the turret about a vertical axis, said casing having a hose exit opening, a hose wound up on said reel with an end extending out of the turret through said opening, a nozzle on said end, a support for said nozzle on said standard, means for automatically turning said reel in a direction to wind up the hose and operative when the nozzle is on said support to wind up hose to the limit permitted by the interengagement of the nozzle and support, a dispensing conduit including as a part thereof said hose, a meter interposed in said conduit, means carried by said standard for forcing liquid through said conduit and meter, a swivel connection in said conduit enabling rotation of the turret, a register driven by the meter and housed within and connected to turn with the turret casing, said turret casing having a window through which the indications of the register are visible and which is located at right angles to the axis of said opening, said hose when pulled to unwind it from the reel acting to turn the turret until said window lies at right angles to the line of pull on the hose.

5. The combination in liquid measuring and dispensing apparatus, of a standard, a turret supported by the standard for rotation about a vertical axis, a hose reel mounted on the turret for rotation independently of the turret about a vertical axis, liquid supply means carried by the standard, a discharge conduit connected to said means and including a flexible hose wound up on said reel and terminating at its delivery end with a nozzle, a meter interposed in said conduit, a register driven by the meter and carried by the turret; a connection interposed in said conduit enabling rotation of part of the conduit, including all of the hose, with the turret while another part of the conduit remains stationary with said standard; a support for said nozzle when not in use, means for turning said reel in a direction to wind up all of said hose except for a short portion extending from the reel to the nozzle when the latter is on said support, and means on the turret engaging opposite sides of the hose, whereby a pull on the hose to unwind it from the reel will turn the turret.

6. In a liquid dispensing apparatus, the combination of a liquid supply line, means in the supply line adapted to automatically measure all liquid flowing through the line, a register operable by connection to said means to indicate the quantity and/or cost of the measured liquid, a hose having a delivery nozzle to extend the supply line to various points of delivery, a hose reel having automatic means tending to keep the hose wound thereon, a casing for the pump composed of a plurality of superimposed parts, the top part being a turret, means for carrying said turret for easy rotation from the adjacent part underneath, means to mount the nozzle of the hose when at rest on a casing part underneath the turret; said turret casing part having mounted therein for rotation therewith said measuring means, said indicating means, and said hose reel; the latter being mounted to rotate also independently of the turret, said indicating means having a window in the turret casing part which is normally held in one fixed relation to the hose nozzle when the latter is mounted at rest, the turret being adapted to have its window automatically follow the direction of a hand pull on the hose when extended for service and to automatically return to the same position when the hose nozzle is mounted at rest and the hose wound up in the turret.

WARREN H. DE LANCEY.